United States Patent
Harris

(10) Patent No.: US 10,831,744 B1
(45) Date of Patent: Nov. 10, 2020

(54) SYSTEM FOR PROCESSING MODIFICATIONS TO DATA RECORDS

(71) Applicant: AMAZON TECHNOLOGIES, INC., Seattle, WA (US)

(72) Inventor: Daniel Morgan Harris, Grosse Pointe Farms, MI (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 191 days.

(21) Appl. No.: 15/923,673

(22) Filed: Mar. 16, 2018

(51) Int. Cl.
*G06F 16/23* (2019.01)
*G06F 16/27* (2019.01)
*G06F 16/21* (2019.01)

(52) U.S. Cl.
CPC ........ *G06F 16/2365* (2019.01); *G06F 16/219* (2019.01); *G06F 16/27* (2019.01)

(58) Field of Classification Search
CPC .... G06F 16/2365; G06F 16/27; G06F 16/219; G06F 16/178; G06F 16/273
USPC ........................................................ 707/634
See application file for complete search history.

(56) References Cited

U.S. PATENT DOCUMENTS

| | | | | |
|---|---|---|---|---|
| 9,224,259 | B1 * | 12/2015 | Miller | G07F 17/32 |
| 9,894,154 | B2 * | 2/2018 | Zhao | H04L 67/1095 |
| 2007/0168516 | A1 * | 7/2007 | Liu | G06F 16/273 |
| | | | | 709/226 |
| 2012/0226776 | A1 * | 9/2012 | Keebler | H04L 67/1095 |
| | | | | 709/217 |
| 2013/0024418 | A1 * | 1/2013 | Sitrick | G06Q 10/101 |
| | | | | 707/608 |
| 2013/0097117 | A1 * | 4/2013 | Lasky | G06F 11/1451 |
| | | | | 707/624 |
| 2014/0006458 | A1 * | 1/2014 | Hsieh | G06F 16/211 |
| | | | | 707/803 |
| 2014/0172793 | A1 * | 6/2014 | Stritzel | G06F 16/1756 |
| | | | | 707/634 |
| 2016/0012099 | A1 * | 1/2016 | Tuatini | G06F 16/2365 |
| | | | | 707/689 |
| 2016/0055194 | A1 * | 2/2016 | Gupta | G06F 16/273 |
| | | | | 707/634 |
| 2016/0253373 | A1 * | 9/2016 | Fryc | G06F 16/1873 |
| | | | | 707/695 |
| 2016/0275125 | A1 * | 9/2016 | Drobychev | G06F 16/23 |
| 2016/0342671 | A1 * | 11/2016 | Leston | G06F 16/273 |

(Continued)

*Primary Examiner* — Hosain T Alam
*Assistant Examiner* — Nicholas E Allen
(74) *Attorney, Agent, or Firm* — Lindauer Law, PLLC

(57) ABSTRACT

Techniques for controlling the synchronization of data records between servers and client devices include use of configuration data for each client device to control the times at which the current version of server data records is sent to each client device. The configuration data also controls the times at which modified versions of local data records on the client device are sent to the server. The configuration data additionally indicates one or more control actions that are performed if the data record version associated with user input modifying a data record does not match the current version of the server data record. Control actions may include preventing modification of data records, providing notifications to client devices, and providing the current version of server data records to client devices. In some cases, control actions may include permitting certain types of modifications while preventing other types of modifications.

20 Claims, 5 Drawing Sheets

(56) References Cited

U.S. PATENT DOCUMENTS

| | | | |
|---|---|---|---|
| 2017/0091253 A1* | 3/2017 | Goldberg | G06F 16/275 |
| 2017/0177690 A1* | 6/2017 | Ritter | G06F 16/2358 |
| 2017/0178042 A1* | 6/2017 | Zimmerman | G06Q 10/06 |
| 2017/0308599 A1* | 10/2017 | Newhouse | G06F 16/182 |

\* cited by examiner

SYSTEM FOR PROCESSING MODIFICATIONS TO DATA RECORDS

BACKGROUND

When multiple devices are able to access and modify a centralized data record or modify a local copy of the data record for future synchronization with the centralized data record, attempted modifications associated with an earlier version of a data record may fail.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
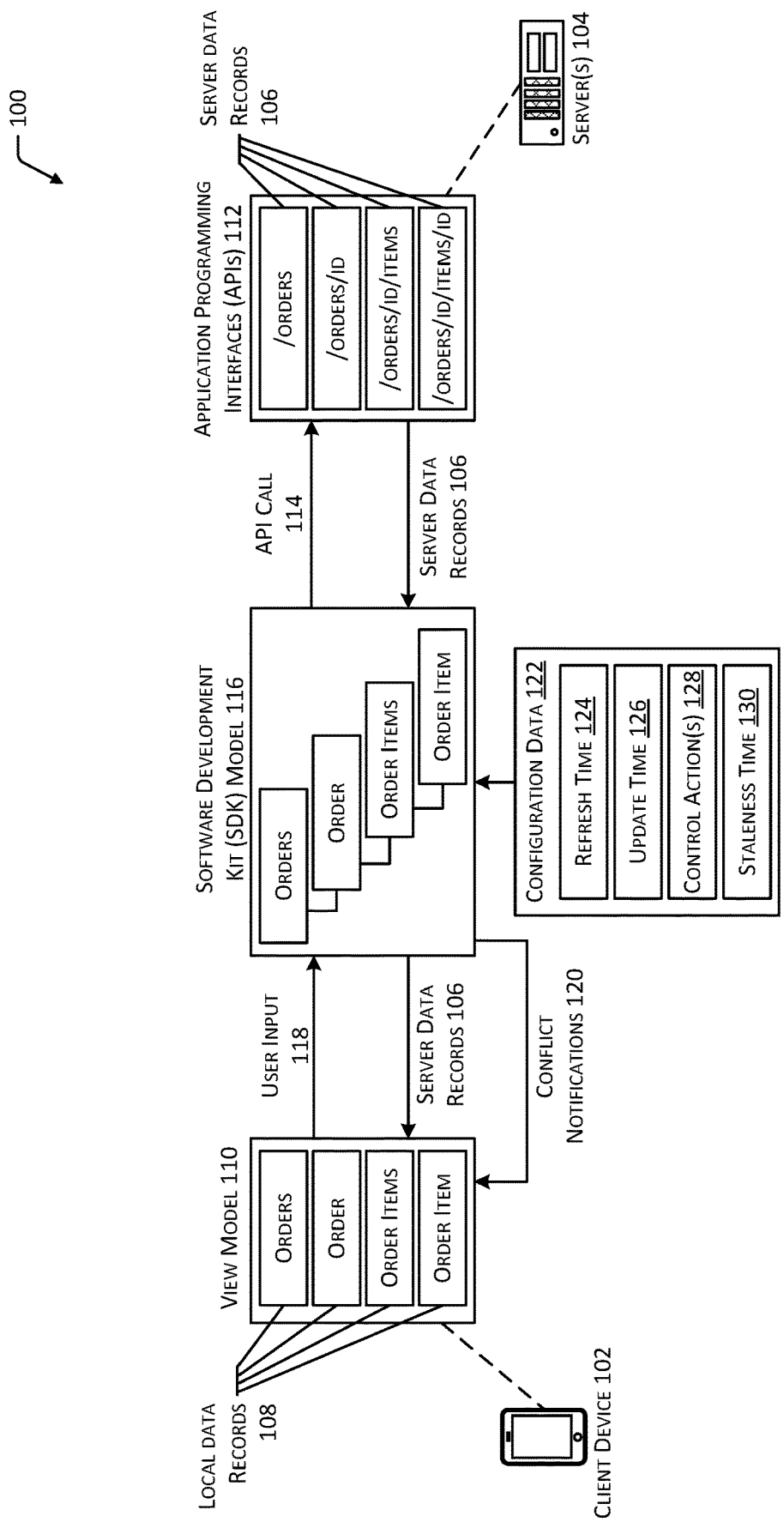
FIG. 1 depicts an implementation of a system for controlling the synchronization of data records between a client device executing an application and a server storing the data records.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Web applications and other types of software executing on computing devices may be configured to communicate with one or more servers, such as by using Ajax web development techniques. For example, a web application may cause a device to communicate asynchronously with a server using a representational state transfer (REST) application programming interface (API) to account for changes in data records. Continuing the example, a web application may provide a modified version of a data record to the server or receive a modified version of the data record from the server using a REST API, to synchronize the versions of the data records between the application and server. However, when multiple applications are configured to access the same data record, either directly by accessing the server or by interacting with a local copy of the data record, typically, only the first application that attempts to modify the data record is successful while other operations that interact with an older version of the data record fail. As such, if two applications attempt to modify the same data record, such as through use of a PUT API, the data written by one application may be lost. However, in cases where an interaction with stale data is permitted to occur, the second interaction may cause previously-received modifications to be overwritten. For example, if a first application modifies the status of a data record associated with the order of a product to "canceled", then a second application modifies a quantity of products to be purchased and restores the status of the order to "processing", the cancellation of the order may be inadvertently overwritten.

As a result, the translation of data from an API to a runtime model must frequently be performed by an application, itself, which may be prone to error when collecting and resolving multiple responses to REST APIs. Furthermore, if an API call cannot be executed immediately, it may be necessary to prevent an application from modifying a local copy of data to avoid the local copy and the data stored in association with a server from becoming desynchronized.

Described in this disclosure are techniques for maintaining synchronization between local and server copies of data records and managing conflicts between versions of data records in a manner that avoids direct interaction between an application executing on a device and the underlying REST API access mechanisms that interact with data stored in a server. For example, a Software Development Kit (SDK) or similar tool may receive user input interacting with a local copy of a data record, and may in turn generate API calls for interacting with a server storing the data records. Each device, application, or instance of an application may have configuration data associated therewith.

The SDK or similar tool may use the configuration data to determine the times or frequencies at which data is exchanged between an application and the server. For example, the configuration data for a first instance of an application may indicate a refresh time of ten seconds. In response to passage of the refresh time, the current version of a data record stored in the server may be transmitted to the device executing the application time. The configuration data may also indicate an update time. In response to passage of the update time, user input, such as the local copy of a modified data record that was provided to the server, may be accessed and used to modify the version of the data record stored in the server. If an intervening modification to the data record stored in the server has occurred prior to passage of the update time, the configuration data may also indicate the manner in which a conflict is to be resolved. For example, the configuration data may indicate a control action to be performed in response to a conflict. Control actions may include providing a notification of the conflict to the device, preventing one or more modifications to the data record from occurring, providing the most recent version of the data record from the server to the device, and so forth. In some implementations, control actions may include performing certain modifications while preventing performance of others. For example, a first type of modification, such as updating a task on a list of tasks as completed, may be processed, while a second type of modification, such as restoring a task deleted by a previous modification, may be prevented. In some implementations, the configuration data may also indicate a staleness time associated with a device or instance of an application. For example, if a device becomes disassociated from a network, the application may continue to modify the local copy of the data record until passage of the staleness time is determined, after which subsequent modifications to the local copy may be prevented. In some implementations, preventing modification of a data record due to the passage of a staleness time may include operating an application in a mode that allows access and viewing of data records while disallowing modification. In some cases, a notification indicating that modifications are disallowed or that further modifications will be prevented may be output to a client device.

Different configuration data may be used for different devices and different instances of applications. For example, two different instances of an application may each have different update times, different refresh times, different staleness times, and so forth. In some implementations, different instances of an application may undertake different control actions in response to a conflict. For example, subsequent to passage of a first refresh time, a first version of a plurality of data records may be provided from a server to a first device. Subsequent to passage of a second refresh time, the first version may be provided from the server to a second device. Both the first device and the second device may be used independently to interact with a local copy of the first version of the data records. Subsequent to passage of a first update time, user input modifying a data record may be received from the first device. The user input may indicate the version of the data record to which the modification corresponds. If the version indicated in the user input matches the current version of the data record stored in the server, the data record may be modified based on the user input to form a second version of the data record. Subsequent to passage of a second update time, user input modifying the first version of the data record may be received from the second device. The user input from the second device may indicate the first version of the data record, which may not match the second version stored in the server. In response to the mismatch between the first and second versions, a control action to resolve this conflict may be determined based on the configuration data for the second device. For example, the control action may include preventing one or more modifications to the data record associated with the user input from the second device and providing the second version of the data record to the second device. In some implementations, the control action may prevent certain types of modifications from occurring, while other modifications associated with the user input are performed.

In some implementations, the configuration data may indicate different refresh times, update times, staleness times, and control actions for different data records. For example, data records associated with a certain category or sub-category of items available for purchase or items having a purchase price greater than a threshold value may be refreshed more frequently than other data records. As another example, a first data record may be updated after passage of an update time, such as every thirty seconds, while a second data record may be updated after a threshold quantity of data has been modified by an application. Configuration data may also indicate a priority for certain types of user input or certain data records. For example, the configuration data may indicate that a first type of modification received from a client device is to be performed prior to a second type of modification, or that modifications to data records having a selected characteristic may be performed prior to other modifications.

As one skilled in the art will appreciate in light of this disclosure, certain embodiments may be capable of achieving certain advantages, including some or all of the following: Use of an SDK or similar tool to insulate users from direct interaction with an underlying REST API mechanism avoids negative user-facing issues, such as race conditions where data may be lost, conflicting or impossible state transitions of data, or the presentation of erroneous or incomprehensible data to users. Such a tool may also enable more rapid development of applications by enabling the development of an application to focus on business logic rather than individually coding API features for each application. Further, the configuration of each device or application may be selected to control the bandwidth used by the device or application, based on the constraints of the system. For example, a refresh time and an update time for a device may be set, without requiring involvement of a server, such that the latency observed by a user remains below a selected amount, independent of whether the device is currently in communication with the same network as the server.

FIG. 1 depicts an implementation of a system 100 for controlling the synchronization of data records between a client device 102 executing an application and a server 104 storing the data records. While FIG. 1 depicts the client device 102 as a single portable computing device and the server 104 as a single server, the client device 102 and the server 104 may each include any number and any type of computing device including, without limitation, mobile devices, set-top boxes, tablet computers, personal computers, wearable computers, servers, and so forth. The server(s) 104 may store one or more server data records 106 in association therewith. The server data records 106 may include one or more of alphanumeric data, audio data, image data, video data, metadata, or other types of data. For example, FIG. 1 depicts the server data records 106 including categories and identifiers associated with transactions for purchasing items. The client device 102 may receive one or more of the server data records 106 and may store the server data records 106 in association with the client device 102, as local data records 108. In some implementations, an application executing on the client device 102 may be configured to output a view model 110 or other type of user interface that may enable a user of the client device 102 to access and modify the local data records 108. The server data records 106 and the local data records 108 may be synchronized by periodically transmitting the most recent version of the server data records 106 to the client device 102 for storage as local data records 108. In cases where the client device 102 is used to modify one or more local data records 108, the modified local data records 108 may be transmitted to the server(s) 104 and stored as a subsequent version of the server data records 106.

The server data records 106 may be accessible using various application programming interfaces (APIs) 112. For example, an API call 114 may be provided to the server(s) 104 to access or modify one or more of the server data records 106. In a conventional system, an application executing on a client device 102 may be configured to provide API calls 114 to the server(s) 104 to access or modify the server data records 106. However, if numerous applications are configured to access the server data records 106 in this manner, data provided from various client devices 102 may be lost or the server data records 106 may become desynchronized with regard to one or more local copies of the data records associated with the client devices 102.

As such, the depicted system 100 includes a software development kit (SDK) model 116 that may receive user input 118 from the client device 102 and provide API calls 114 to the server(s) 104. While FIG. 1 depicts a single client device 102, for illustrative purposes, that provides user input 118 to the SDK model 116, in other implementations, any number of client devices 102 may provide and receive data via the SDK model 116. As such, the SDK model 116 may function as an interface that receives user input 118 from multiple sources, maintains a record of the current state of the server data records 106, and provides API calls 114 to the server(s) 104 based on at least a portion of the user input 118. When user input 118 cannot be used to modify a server data record 106, such as in cases where the user input 118 corresponds to a previous version of a server data record 106, the user input 118 may be prevented from use modifying the server data record 106, a conflict notification 120 may be provided to the client device 102, and in some cases, the most recent version of the server data records 106 may be provided to the client device 102.

The SDK model 116 may access a library or other data source containing configuration data 122 associated with the client device 102 or the application executing on the client device 102. The configuration data 122 may be used to control the synchronization of data records between the client device 102 and server(s) 104 and the manner in which conflicts are resolved to maintain synchronization between the server data records 106 and local data records 108. In some implementations, the configuration data 122 may be provided by the server(s) 104 and used to configure one or more portions of the SDK model 116 executing on the client device 102 or another computing device in communication therewith. For example, the configuration data 122 provided by the server(s) 104 may indicate default times at which data records are to be synchronized and the manner in which conflicts are to be resolved.

The configuration data 122 may indicate a refresh time 124. The refresh time 124 may indicate a length of time or a specific time at which the most recent version of the server data records 106 may be provided to the client device 102 for storage as local data records 108. In some implementations, the refresh time 124 may indicate a quantity of data. For example, if a quantity of data (e.g., a count of server data records 106 or a count of bytes) that exceeds the quantity indicated by the refresh time 124 is modified, such as via user input 118 from one or more client devices 102, the most recent version of the server data records 106 may be provided to the client device 102.

The configuration data 122 may also indicate an update time 126. The update time may indicate a length of time or a specific time after which the local data records 108 may be provided to the server(s) 104 for storage as a subsequent version of the server data records 106. In some implementations, transmission of the local data records 108 may be omitted if user input 118 has not modified any of the local data records 108. In other implementations, the update time 126 may indicate a quantity of data. For example, if a count of local data records 108 or a quantity of bytes of data in excess of the quantity indicated by the update time 126 is modified, the modified version of the local data records 108 may be provided to the server(s) 104 in response to this determination. The user input 118 provided from the client device 102 to the SDK model 116 may indicate the version of the server data records 106 that was most recently received by the client device 102. If the version indicated by the user input 118 matches the most recent version retained by the SDK model 116, the user input 118 may be used to modify the server data records 106. For example, in response to the user input 118, the SDK model 116 may generate an API call 114 that modifies one or more server data records 106 based on the user input 118.

If the version indicated by the user input 118 does not match the most recent version retained by the SDK model 116, this may indicate that another client device 102 or other source has modified the server data records 106 subsequent to receipt of the server data records 106 by the client device 102 but prior to transmission of the user input 118 to the SDK model 116. In such a case, the configuration data 122 may indicate one or more control actions 128 that may be used to resolve such a conflict. For example, a control action 128 may include preventing modification of a server data record 106 based on the user input 118, providing a conflict notification 120 to the client device 102 indicative of the failure to modify the server data record 106, and in some cases, providing the most recent version of the server data records 106 to the client device 102.

The configuration data 122 may also indicate a staleness time 130 associated with the client device 102. The staleness time 130 may indicate a specific time or length of time after which modifications to local data records 108 by the client device 102 may be prevented. For example, if the client device 102 becomes disassociated from the network that includes the server(s) 104, the staleness time 130 may indicate a maximum length of time, after which subsequent modifications to the local data records 108 may be prevented to minimize desynchronization between the local data records 108 and the server data records 106. In some implementations, the staleness time 130 may indicate a quantity of data. For example, if the client device 102 becomes disassociated from the network that includes the server(s) 104, the client device 102 may modify a threshold count of local data records 108 or a threshold quantity of bytes of data indicated by the staleness time 130.

Thus, in use, the system 100 shown in FIG. 1 may determine passage of the refresh time 124 associated with the client device 102. In response to passage of the refresh time 124 associated with the client device 102, the SDK model 116 may provide the most recent version of the server data records 106 to the client device 102, which may be stored as local data records 108. A user may access or modify the local data records 108 by providing user input 118 via the view model 110. In response to passage of the update time 126 associated with the client device 102, the user input 118 may be provided to the SDK model 116. In some implementations, the user input 118 may include a modified version of the local data records 108. The user input 118 may indicate the version of the server data records 106 with which the user input 118 is associated. The SDK model 116 may determine correspondence between the version indicated in the user input 118 and the most recent version of the server data records 106. If the version indicated in the user input 118 corresponds to the most recent version, the SDK model 116 may provide an API call 114 to the server(s) 104 to modify one or more server data records 106 based on the user input 118. If the version indicated in the user input 118 does not correspond to the most recent version, the SDK model 116 may determine one or more control actions 128 to perform based on the configuration data 122. For example, a conflict notification 120 and the most recent version of the server data records 106 may be provided to the client device 102 while modification of the server data records 106 based on the user input 118 may be prevented. In the event that the client device 102 becomes disassociated from the network that includes the server(s) 104, the staleness time 130 indicated in the configuration data 122 may limit the length of time during which the local data records 108 may be modified to reduce desynchronization with the server data records 106.

The SDK model 116 may execute on the client device 102, the server(s) 104, or one or more other computing devices in communication with the client device 102 and the server(s) 104, or combinations of these computing devices. For example, a first portion of the SDK model 116 executing on the client device 102 may receive user input 118 and generate API calls 114 to interact with the server data records 106, while a second portion of the SDK model 116 executing on the server(s) 104 may determine conflicts if the user input 118 is associated with a previous version of the server data records 106 and provide conflict notifications 120. Similarly, a first portion of the configuration data 122 may be stored in association with the client device 102 while a second portion of the configuration data 122 may be stored in association with the server(s) 104. The SDK model 116 may also be associated with networking and serialization components that may be used to convert data from the server(s) 104 to a form that may be processed by the client device 102 for output in the view model 110, and to convert data from the client device 102 to a form that may be processed by the server(s) 104.

Figure 2:
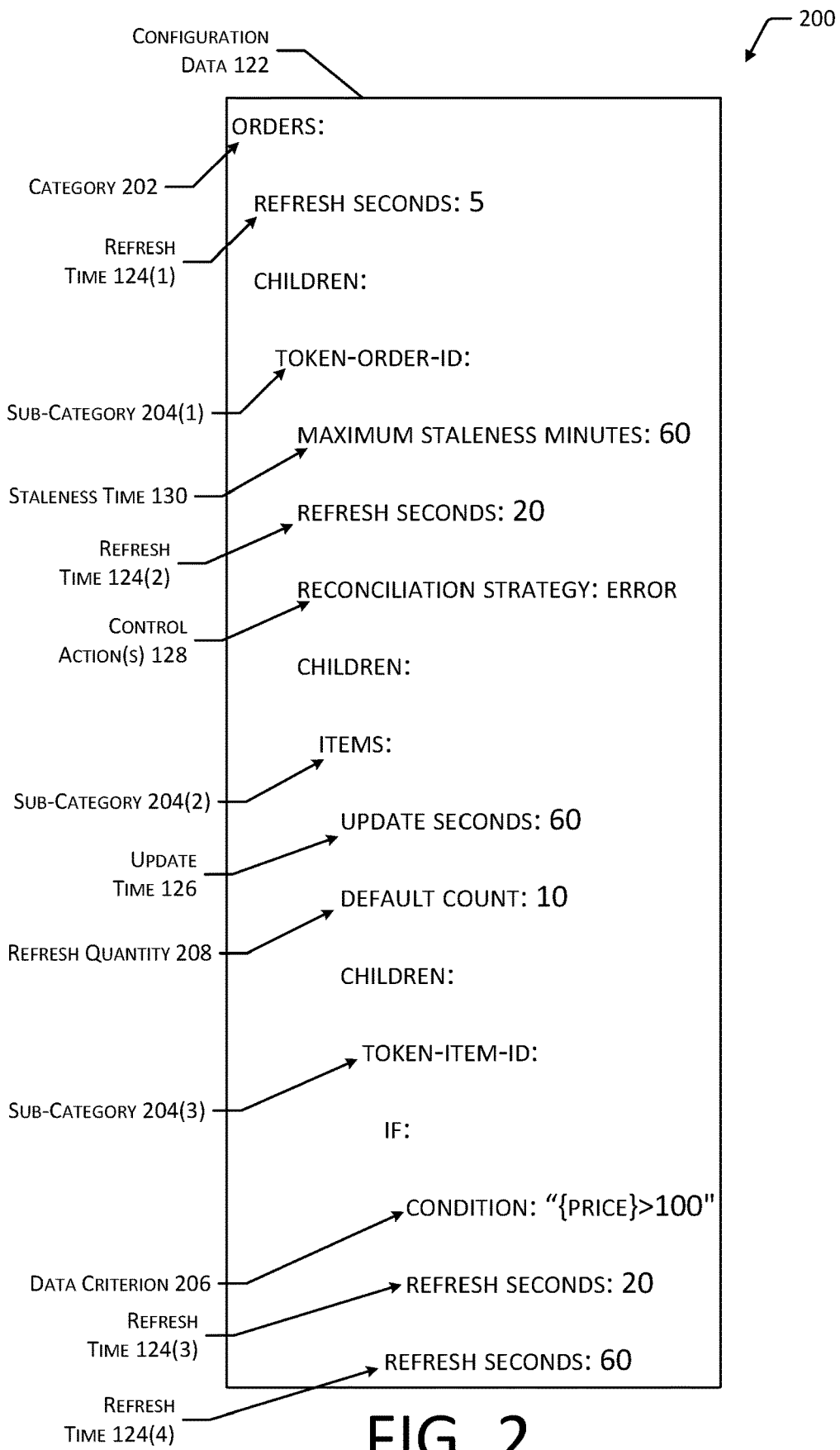
FIG. 2 is a block diagram illustrating example configuration data that may be associated with a client device, application, or data record.

FIG. 2 is a block diagram 200 illustrating example configuration data 122 that may be associated with a client device 102, application, or data record. As described with regard to FIG. 1, the configuration data 122 may control the times or frequency at which data records are transmitted from the server(s) 104 to a client device 102, and times or frequencies at which data records or other types of user input 118 are transmitted from the client device 102 and used to generate API calls 114 to interact with the server data records 106. The configuration data 122 may also indicate a staleness time 130 after which modification of local data records 108 may be prevented, and one or more control actions 128 that may be performed if user input 118 that modifies a non-current version of a data record is received.

While in some implementations, configuration data 122 may indicate times and control actions for use with all data records associated with a client device 102 or application, in other implementations, the configuration data 122 may indicate different times or control actions for different types or portions of data records. For example, the configuration data 122 of FIG. 2 indicates a general category 202 of data records, such as "orders" associated with items available for purchase. The indicated category 202 may include one or more sub-categories 204. For example, the "orders" category 202 may include a "token-order-id" sub-category 204(1), which may in turn include an "items" sub-category 204(2), which may include a "token-item-id" sub-category 204(3). In some cases, the configuration data 122 may indicate one or more different refresh times 124, update times 126, control actions 128, or staleness times 130 for different categories and sub-categories 204.

For example, the example configuration data 122 indicates a first refresh time 124(1) that corresponds to the "orders" category 202 (e.g., "refresh seconds: 5"). The configuration data 122 indicates a second refresh time 124(2) (e.g., "refresh seconds: 20") associated with the "token-order-id" sub-category 204(1). The configuration data 122 also indicates an update time 126 (e.g., "update seconds: 60") associated with the "items" sub-category 204(2). In some cases, the configuration data 122 may indicate different times or control actions 128 based on the characteristics of particular data records other than the category 202 or sub-category 204. For example, FIG. 2 depicts the configuration data 122 indicating a data criterion 206, such as the price of an item available for purchase, in the form of a conditional statement. If the conditional statement (e.g., "{price}>100") is true for a data record associated with the "token-item-id" sub-category 204(3), the configuration data 122 indicates a third refresh time 124(3) (e.g., "refresh seconds: 20") that may be used. However, if the conditional statement is not true for a data record associated with the "token-item-id" sub-category 204(3), the configuration data 122 indicates a fourth refresh time 124(4) (e.g., "refresh seconds: 60") that may be used. The configuration data 122 may also indicate a count of data records to be refreshed when a refresh time 124 occurs. For example, the configuration data 122 may indicate a refresh quantity 208 that indicates a count of server data records 106 provided to a client device 102 when passage of a refresh time 124 is determined. As such, different quantities of server data records 106 may be provided to a client device 102 at different frequencies or times based on the category 202, sub-category 204, or other data criteria 206 that apply to each data record. For example, data records associated with items having a greater price may be provided to a client device 102 more frequently than other data records.

The depicted configuration data 122 also indicates a staleness time 130 (e.g., "maximum staleness minutes: 60") for the first sub-category 204(1) and a control action 128 (e.g., "reconciliation strategy: error") for the first sub-category 204(1). In some implementations, if the configuration data 122 does not indicate a specific refresh time 124, update time 126, control action 128, or staleness time 130 for a particular sub-category 204, the times or control actions 128 for a parent category 202 or sub-category 204 may be used. In other implementations, a default refresh time 124, update time 126, control action 128, or staleness time 130 may be used if specific values are not indicated in the configuration data 122.

Figure 3:
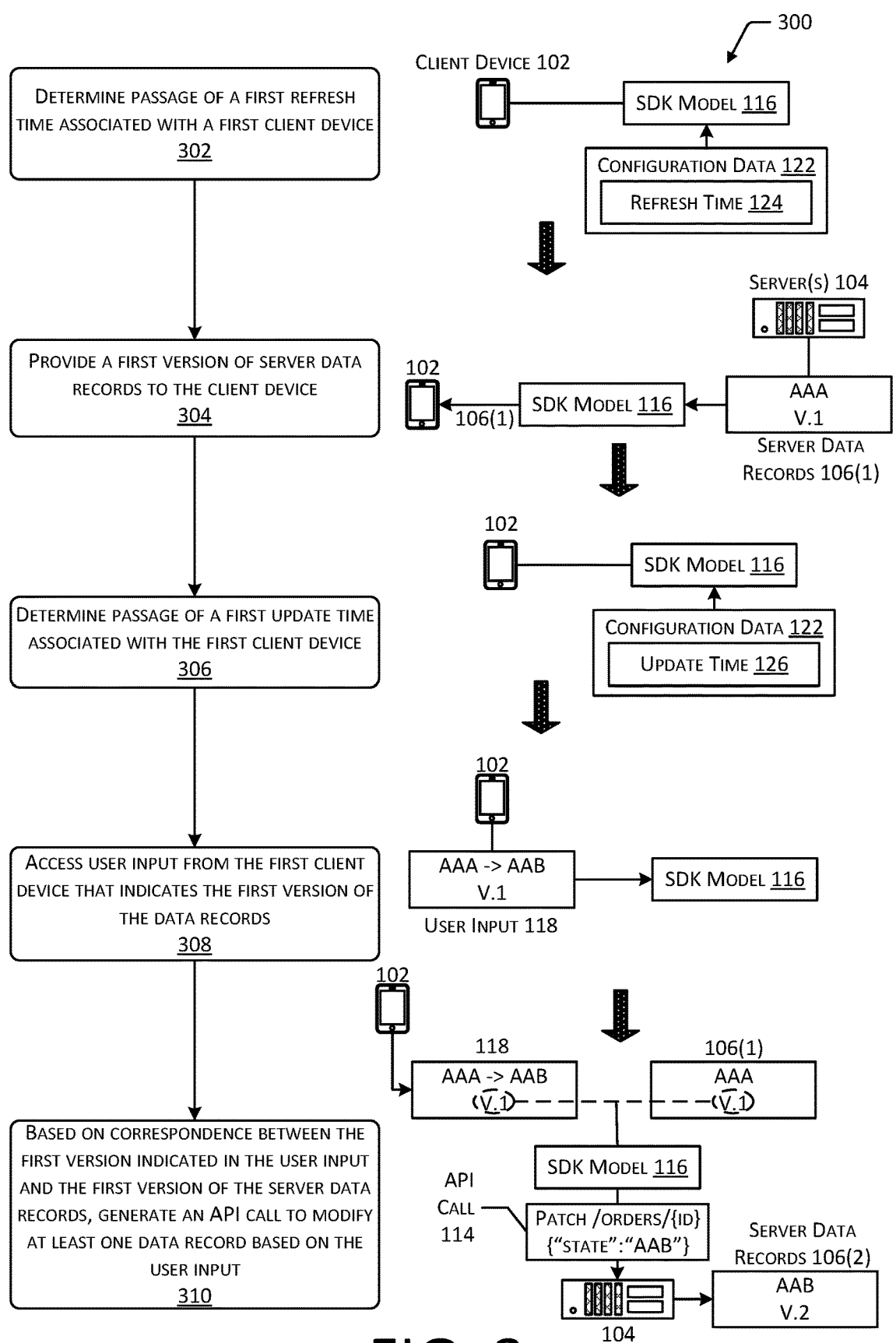
FIG. 3 depicts a scenario illustrating a method for controlling the synchronization of data records between a client device executing an application and a server storing the data records, based on configuration data for the client device.

FIG. 3 depicts a scenario 300 illustrating a method for controlling the synchronization of data records between a client device 102 executing an application and a server 104 storing the data records, based on configuration data 122 for the client device 102. For example, a client device 102 may communicate with one or more servers 104 storing data records using one or more networks. The server data records 106 may be accessible via one or more APIs 112. For example, use of REST API mechanisms to access the server data records 106 may enable stateless operations to be used to access and modify the server data records 106, such as through use of API calls 114. Continuing the example, REST API mechanisms may operate independent from an HTTP session or other type of state-based session, such that all state information is retained on one of the client device 102, server 104, or other computing device in communication with the client device 102 and server 104. While FIG. 3 depicts a single client device 102, any number of client devices 102 may transmit and receive data records via the SDK model 116, as described with regard to FIG. 1. As described with regard to FIG. 1, the SDK model 116 may execute on the client device 102, the server(s) 104, another computing device in communication with the client device 102 and server(s) 104, or combinations thereof. For example, a portion of the SDK model 116 associated with providing server data records 106 to a client device 102 and processing user input 118 received from the client device 102 may execute on the client device 102, while a portion of the SDK model 116 associated with the determination and resolution of conflicts may execute on the server(s) 104.

At 302, passage of a first refresh time 124 associated with a first client device 102 may be determined. For example, as described with regard to FIGS. 1 and 2, configuration data 122 associated with a client device 102 may indicate a refresh time 124. The refresh time 124 may indicate a specific time, a length of time, specific data, or a quantity of data associated with transmission of server data records 106 from the server(s) 104 to the client device 102.

As such, after passage of the specific time or length of time, or after a specific data record or quantity of data associated with the server(s) 104 has been modified, at 304, a first version of the server data records 106(1) may be provided to the client device 102. The client device 102 may receive the server data records 106(1) via the SDK model 116. In some implementations, the SDK model 116 may be generated by or executing on the server(s) 104. In other implementations, the SDK model 116 may be generated by or executing on the client device 102. In still other implementations, the SDK model 116 may be generated by or executing on a separate computing device other than the server(s) 104 or client device 102.

At 306, passage of a first update time 126 associated with the first client device 102 may be determined. For example, as described with regard to FIG. 1, configuration data 122 associated with the client device 102 may indicate an update time 126. The update time 126 may indicate a specific time, a length of time, specific data, or a quantity of data associated with transmission of local data records 108, user input 118, or other data indicative of modifications to one or more data records, from the client device 102 to the server(s) 104.

For example, after passage of a specific time or length of time, or after a specific data record or quantity of data stored in association with the client device 102 has been modified, at 308, user input 118 indicating a modification to one or more local data records 108 that was received using the client device 102 may be accessed by the SDK model 116. The user input 118 may be received prior to or concurrent with passage of the update time 126. In some implementations, the user input 118 may include an indication of the version associated with the data records. For example, if the user input 118 includes a modification to the first version of the server data records 106(1), the user input 118 may indicate the first version. In some implementations, the client device 102 or another computing device in communication therewith may generate a view model 110 based on the received server data records 106(1), which may be stored in association with the client device 102 as local data records 108. The view model 110 may include a user interface or other mechanism configured to receive user input 118 to access or modify one or more local data records 108. In other implementations, the user input 118 may include modifications generated by processes, services, or other automated mechanisms rather than by a human user. For example, in response to a purchase or order conducted in an online marketplace, one or more services may automatically modify various data records based on characteristics of the purchase or order.

At 310, based on correspondence between the first version indicated in the user input 118 and the first version of the server data records 106(1), the SDK model 116 may generate an API call 114 to modify at least one data record based on the user input 118. Correspondence between the first versions may include determining a match between a version identifier or other indication of the first version included in the user input 118 and a version identifier or other indication associated with the server data records 106(1). In some cases, the current version or state of the server data records 106(1) may be retained by the SDK model 116. In other implementations, correspondence between the first versions may include determining a match between the data records modified by the user input 118 and the server data records 106(1). In some cases, correspondence may include a near-match, such as a value for a data record modified via user input 118 being within a threshold tolerance of the associated server data record 106(1). In still other implementations, correspondence between the first version may include determining a match or near-match between the local data records 108 stored in association with the client device 102 and the server data records 106(1). For example, if at least a threshold portion of the local data records 108 match or are within a threshold tolerance of corresponding server data records 106(1), correspondence between the first versions may be determined. In response to the API call 114, the server(s) 104 may modify the first version of the server data records 106(1) to form a second version of the server data records 106(2). In some implementations, subsequent to the modification, the server(s) 104 may provide the second version of the server data records 106(2) to the SDK model 116, which may in turn provide the server data records 106(2) to the client device 102. In other implementations, based on the correspondence between the first versions and the successful modification of the data record(s), one or more of the SDK model 116 or client device 102 may update the data records stored in association therewith without receiving the data records from the server(s) 104.

Figure 4:
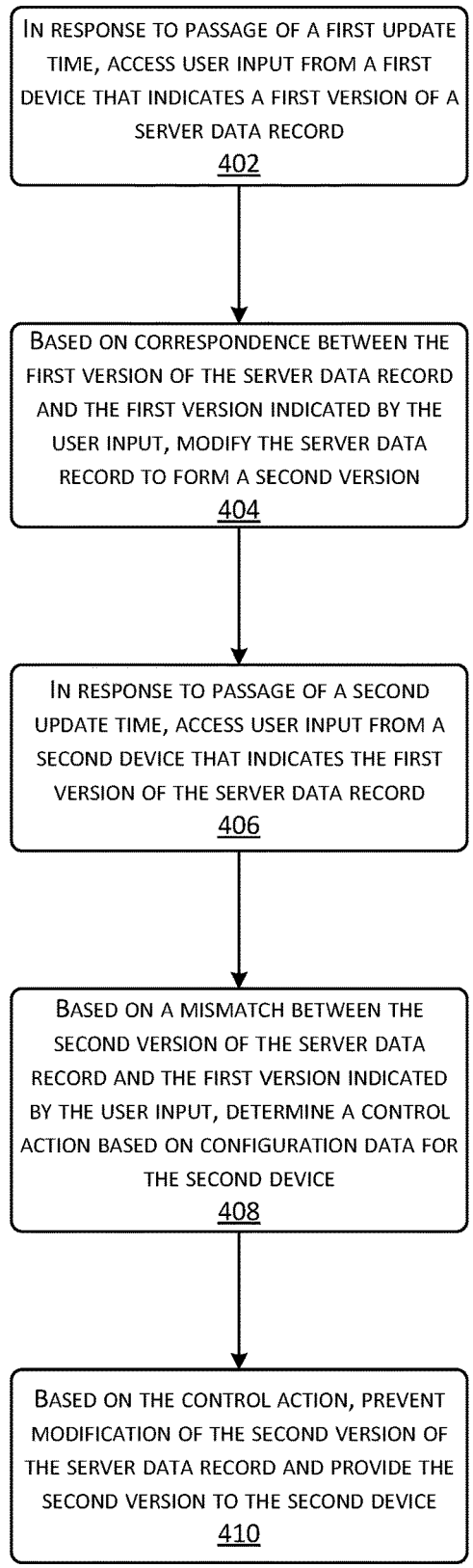
FIG. 4 depicts a scenario illustrating a method for preventing desynchronization of data records between multiple client devices and a server storing the data records, based on configuration data for the client devices.
Figure 4:
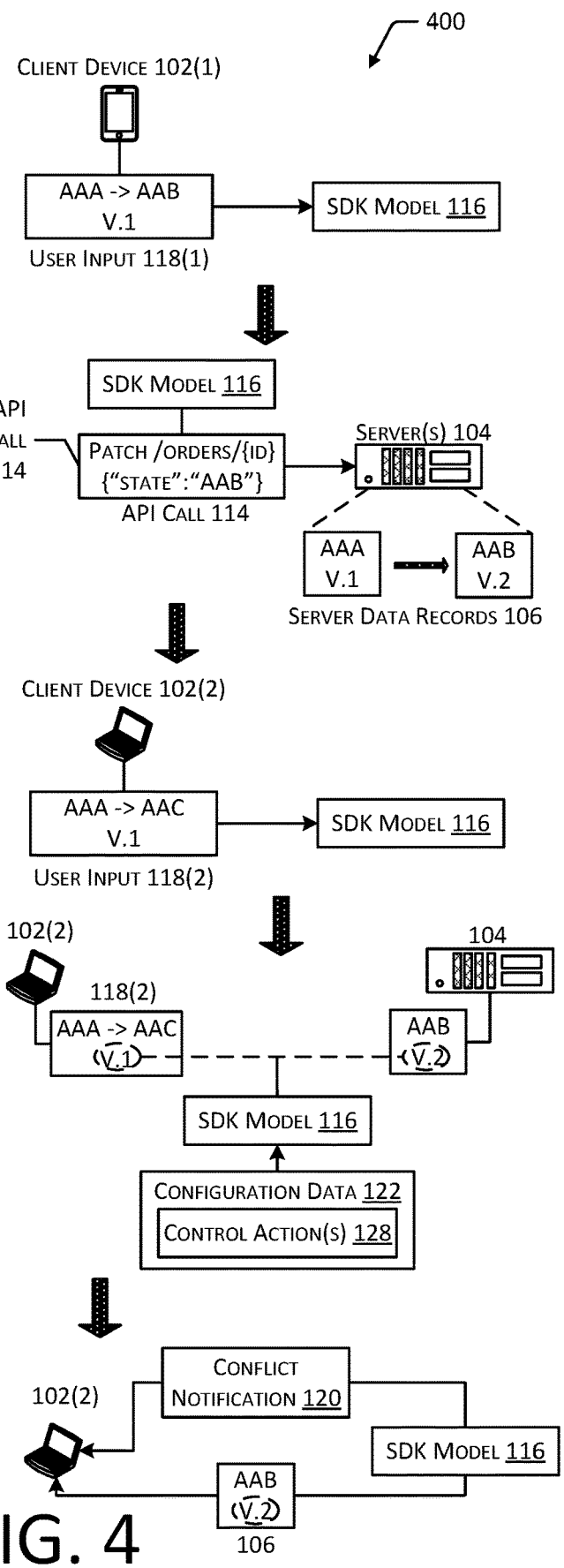

FIG. 4 depicts a scenario 400 illustrating a method for preventing desynchronization of data records between multiple client devices 102 and a server 104 storing the data records based on configuration data 122 for the client devices 102. As described with regard to FIGS. 1 and 3, one or more client devices 102 may communicate with one or more servers 104 via one or more networks. Data records and other data may be transmitted between the client devices 102 and the server(s) 104 via an SDK model 116, which may be executing on one or more client devices 102, one or more servers 104, or one or more other computing devices in communication therewith.

At 402, in response to passage of a first update time 126, user input 118(1) from a first client device 102(1) may be accessed by the SDK model 116. In some implementations, the user input 118(1) may be received prior to passage of the first update time 126 and accessed in response to passage of the first update time 126. In other implementations, the user input 118(1) may be received from the client device 102(1) in response to passage of the update time 126. The user input 118(1) may indicate a first version of a data record. For example, as described with regard to FIGS. 1 and 3, the first update time may indicate a specific time, a length of time, specific data, or a quantity of data associated with transmission of local data records 108, user input 118(1), or other data indicative of modifications to one or more data records, from the client device 102 to the server(s) 104. After passage of the specific time or length of time, or after a specific data record or quantity of data stored in association with the client device 102 has been modified, user input 118(1) indicating a modification to one or more local data records 108 may accessed by the SDK model 116.

At 404, based on correspondence between the first version of the data record and the first version indicated by the user input 118(1), the data record may be modified to form a second version. For example, the SDK model 116 may determine correspondence between the values of one or more data records or a version identifier associated with the user input 118(1) and the values or version identifier associated with corresponding server data records 106. In response to a match or near-match, as described with regard to FIG. 3, the SDK model 116 may generate an API call 114 based on the user input 118 to modify one or more server data records 106. The server(s) 104 may modify the first version of the server data records 106 to form a second version of the server data records 106.

At 406, in response to passage of a second update time 126, user input 118(2) from a second client device 102(2) may be accessed. The user input 118(2) may indicate the first version of the data record. For example, both the first client device 102(1) and the second client device 102(2) may receive the first version of a server data record 106 in response to passage of a respective refresh time 124 associated with each client device 102. In some cases, the server data records 106 may be modified by first user input 118(1), and a second client device 102(2) may provide user input 118(2) to modify the first version of the server data records 106 prior to receiving the modified version of the server data records 106. As such, the second user input 118(2) may indicate a previous version of the server data records 106 prior to modification of the server data records 106 based on previous user input 118(1).

At 408, based on a mismatch between the second version of the server data record 106 and the first version indicated by the user input 118(2), a control action 128 may be determined based on configuration data 122 for the second client device 102(2). For example, as described with regard to FIGS. 1 and 2, configuration data 122 for a client device 102(2) may indicate one or more control actions 128 to be performed in the event that a conflict between data records is determined. Continuing the example, the user input 118(2) received from the second client device 102(2) may include a version identifier or values that correspond to a first version of a data record, while the server(s) 104 or SDK model 116 may retain server data records 106 associated with a differing version identifier or different values.

Possible control actions 128 may include providing conflict notifications 120 to one or more client devices 102, servers 104, or other computing devices, providing the most recent version of the server data records 106 to the second client device 102(2), or preventing at least one modification associated with the user input 118(2) from occurring. In some implementations, control actions 128 may include performing certain types of modifications while preventing other types of modifications. For example, a modification that adds a new value to a data record may be performed, while a modification that changes an existing value of a data record may be prevented from occurring. As such, at 410, based on the determined control action(s) 128, modification of the second version of the data record may be prevented, and the second version may be provided to the second client device 102(2). A conflict notification 120 indicative of the mismatch may also be provided to the second client device 102(2).

Figure 5:
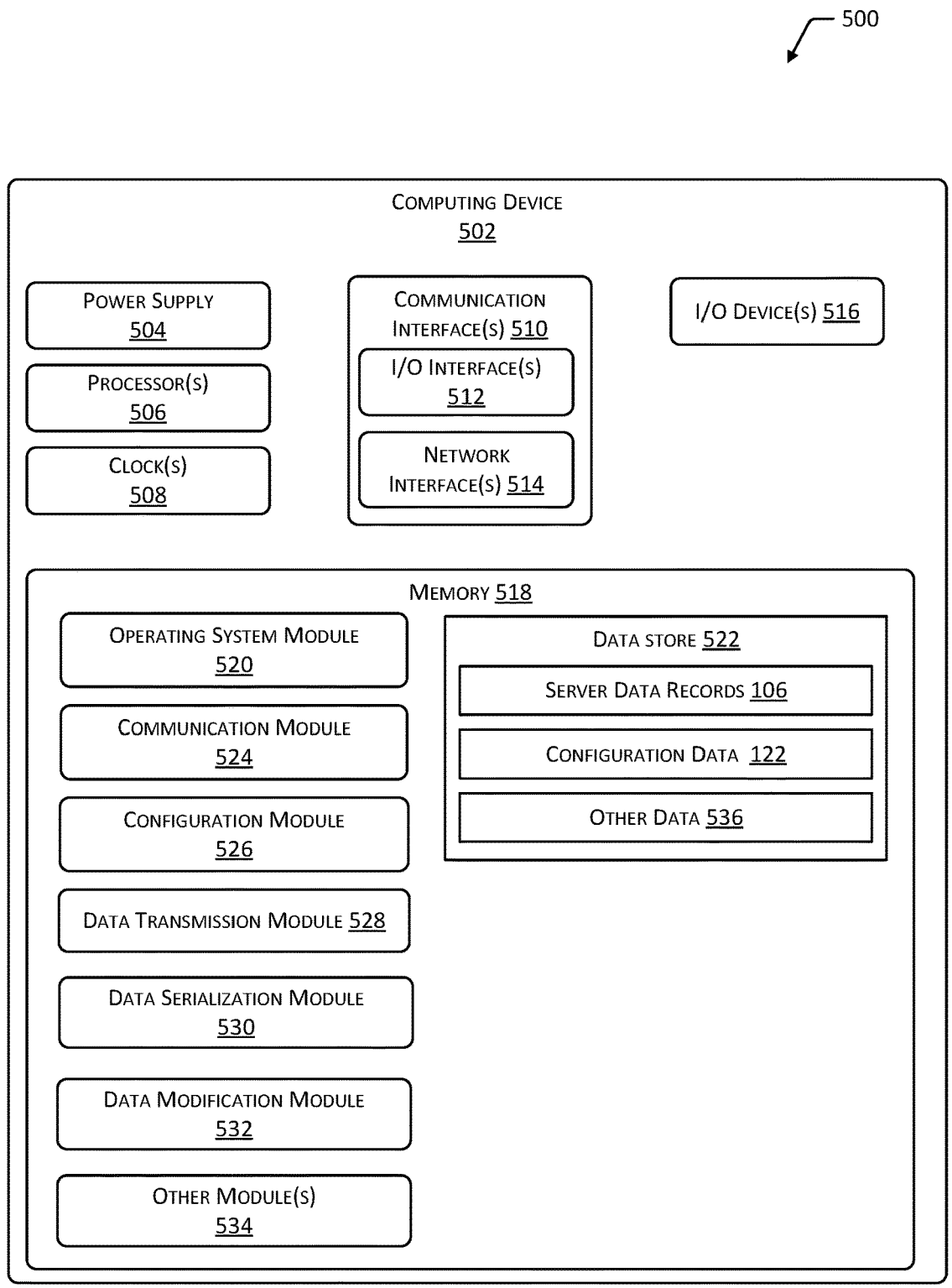
FIG. 5 is a block diagram illustrating a computing device within the scope of the present disclosure.

FIG. 5 is a block diagram 500 illustrating a computing device 502 within the scope of the present disclosure. The computing device 502 may include the client device 102, the server 104, or one or more other computing devices 502 in communication with the client device 102 or server 104. While FIG. 5 depicts a single block diagram 500 representative of a computing device 502, any number of networked computing devices 502 may perform the implementations described herein.

One or more power supplies 504 may be configured to provide electrical power suitable for operating the components of the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. One or more clocks 508 may provide information indicative of date, time, ticks, and so forth. For example, the processor(s) 506 may use data from the clock 508 to generate a timestamp, trigger a preprogrammed action, and so forth. Continuing the example, data from the clock 508 may be used to determine the occurrence or passage of refresh times 124, update times 126, or staleness times 130 indicated in configuration data 122 for one or more client devices 102.

The computing device 502 may include one or more communication interfaces 510, such as input/output (I/O) interfaces 512, network interfaces 514, and so forth. The communication interfaces 510 may enable the computing device 502, or components of the computing device 502, to communicate with other computing devices 502 or components of the other computing devices 502. The I/O interfaces 512 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O devices 516. The I/O devices 516 may include any manner of input device or output device associated with the computing device 502. For example, I/O devices 516 may include touch sensors, keyboards, mouse devices, microphones, image sensors (e.g., cameras), scanners, displays, speakers, haptic devices, printers, and so forth. In some implementations, the I/O devices 516 may be physically incorporated with the computing device 502 or may be externally placed.

The network interfaces 514 may be configured to provide communications between the computing device 502 and other devices, such as the I/O devices 516, routers, access points, and so forth. The network interfaces 514 may include devices configured to couple to one or more networks including local area networks (LANs), wireless LANs (WLANs), wide area networks (WANs), wireless WANs, and so forth. For example, the network interfaces 514 may include devices compatible with Ethernet, Wi-Fi, Bluetooth, ZigBee, Z-Wave, 3G, 4G, LTE, and so forth.

The computing device 502 may include one or more busses or other internal communications hardware or software that allows for the transfer of data between the various modules and components of the computing device 502.

As shown in FIG. 5, the computing device 502 may include one or more memories 518. The memory 518 may include one or more computer-readable storage media (CRSM). The CRSM may be any one or more of an electronic storage medium, a magnetic storage medium, an optical storage medium, a quantum storage medium, a mechanical computer storage medium, and so forth. The memory 518 may provide storage of computer-readable instructions, data structures, program modules, and other data for the operation of the computing device 502. A few example modules are shown stored in the memory 518, although the same functionality may alternatively be implemented in hardware, firmware, or as a system on a chip (SoC).

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processors 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 522 and one or more of the following modules may also be associated with the memory 518. The modules may be executed as foreground applications, background tasks, daemons, and so forth. The data store(s) 522 may use a flat file, database, linked list, tree, executable code, script, or other data structure to store information. In some implementations, the data store(s) 522 or a portion of the data store(s) 522 may be distributed across one or more other devices including other computing devices 502, network attached storage devices, and so forth.

The communication module 524 may be configured to establish communications with one or more other computing devices 502, such as to transmit data records 106, user input 118, API calls 114, conflict notifications 120, or other types of data between computing devices 502. Communications may be authenticated, encrypted, and so forth.

The memory 518 may store a configuration module 526. The configuration module 526 may receive configuration data 122 for one or more client devices 102, types of client devices 102, data records, or other types of data records. For example, configuration data 122 may indicate an update time 126, refresh time 124, and staleness time 130 for a particular client device 102 and one or more control actions 128 to be executed if user input 118 from the client device 102 attempts to modify a version of a server data record 106 that is no longer current. As another example, configuration data 122 may indicate a particular type of client device 102 or a particular characteristic of one or more client devices 102, and the update time 126, refresh time 124, staleness time 130, and control actions 128 of the configuration data 122 may be used for each client device 102 of the particular type or having the particular characteristic. As yet another example, as described with regard to FIG. 2 configuration data 122 may indicate a particular category 202, sub-category 204, or data criterion 206, and the update time 126, refresh time 124, staleness time 130, and control actions 128 of the configuration data 122 may be used for each data record corresponding to the category 202, sub-category 204, or data criterion 206. In some implementations, configuration data 122 may be received via user input 118. In other implementations, configuration data 122 may include default values or values that are changed automatically in response to control actions 128. For example, in response to a count or percentage of conflicts that exceeds a threshold count or percentage, a refresh time 124 may be automatically decreased to provide current versions of data records to client devices 102 more frequently. In some implementations, the configuration module 526 may provide configuration data 122 to client devices 102 or other types of computing devices 502 to configure the times at which data is provided to the computing device(s) 502, the times at which data from the computing device(s) 502 is processed, and the manner in which an attempt to modify a previous version of a data record is resolved.

The memory 518 may also include a data transmission module 528. The data transmission module 528 may determine passage of a refresh time 124, such as based on data from the clock 508. In response to the passage of the refresh time 124, the data transmission module 528 may transmit one or more server data records 106 to a client device 102. The data transmission module 528 may also determine passage of an update time 126. In response to passage of the update time 126, the data transmission module 528 may receive user input 118 from one or more client devices 102. In some implementations, data may be transmitted to or received from another computing device 502 automatically, upon passage of a refresh time 124 or update time 126. In other implementations, upon passage of a refresh time 124 or update time 126, a request may be provided to another computing device 502 to cause the computing device 502 to transmit data records or other data.

The memory 518 may additionally include a data serialization module 530. The data serialization module 530 may convert data transmitted between computing devices 502 to formats useable by the receiving computing device 502. For example, user input 118 from a client device 102 may be converted to JavaScript Object Notation (JSON) or another format that may be processed by a server 104 to generate an API call 114 or determine an existence of a conflict. The data serialization module 530 may also convert data transmitted by a server 104 to a format useable by a client device 102.

The memory may further include a data modification module 532. The data modification module 532 may receive user input 118 indicative of one or more modifications to a data record. In response to the user input 118, the data modification module 532 may determine the server data record(s) 106 that correspond to the user input 118. The data modification module 532 may then determine correspondence between the version of the data record(s) associated with the user input 118 and the version of the server data record 106 to be modified. If the version indicated by the user input 118 corresponds to the version of the server data record 106, the data modification module 532 may cause the server data record 106 to be modified based on the user input 118. For example, the data modification module 530 may generate an API call 114 to cause the server data record 106 to be modified. If the version indicated by the user input 118 does not correspond to the version of the server data record 106, the data modification module 532 may determine one or more control actions 128 based on the configuration data 122 for the client device 102 providing the user input 118 or for the data record. In some cases, the data modification module 532 may perform certain modifications based on the control action(s) 128, while preventing performance of other modifications. Other control actions 128 may include providing conflict notifications 120 to one or more computing devices 502 and providing the current version of the server data records 106 to one or more computing devices 106. In some implementations, the data modification module 532 may also be configured to determine passage of a staleness time 130. For example, based on data received from the clock 508, if a staleness time 130 has passed, user input 118 attempting to modify a data record may be prevented from modifying the data record. Continuing the example, if a client device 102 or other type of computing device 502 becomes disassociated from a network from which the computing device 502 receives server data records 106, the computing device 502 may continue to store and provide access to a non-current version of the server data records 106 independent of the refresh time 124 for the computing device 502. To reduce the potential for desynchronization between the non-current version and the current version of the server data records 106, modifications to the non-current data records may be prevented after passage of the staleness time 130.

Other modules 534 may also be present in the memory 518. For example, encryption modules may be used to encrypt and decrypt communications between computing devices 502. Authentication modules may be used to authenticate communications sent or received by computing devices 502. Other modules 534 may further include a user interface module, which may provide a user interface for receiving configuration data 122 or user input 118 to access or modify server data records 106. For example, a user interface module may generate a view model 110 based on the received data records and receive user input 118 via the view model 110. Other modules 534 may also include a machine learning module. For example, based on the number or frequency of modifications to data records, the number or frequency of conflicts, and so forth, a machine learning module may automatically modify one or more elements of the configuration data 122, such as by increasing a refresh time 124 to reduce the potential for conflicting modifications.

Other data 536 within the data store(s) 522 may include user input data, such as configurations and settings associated with computing devices 502. Other data 536 may include security data, such as encryption keys and schema, access credentials, and so forth. Other data 536 may also include default configuration data 122 or other default values and configurations for the computing device 502.

In different implementations, different computing devices 502 may have different capabilities or capacities. For example, servers 104 may have greater processing capabilities or data storage capacity than client devices 102.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions;
one or more hardware processors to execute the computer-executable instructions to:
provide a first version of a plurality of data records to a first client device;
provide the first version of the plurality of data records to a second client device;
determine, based on first configuration data associated with the first client device, a first update time;
in response to passage of the first update time, access first user input received from the first client device, wherein the first user input includes a first stateless operation for modifying a first data record of the plurality of data records and indicates the first version;
determine a second version of the plurality of data records based on the first version of the plurality of data records and the first user input;
determine, based on second configuration data associated with the second client device, a second update time;
in response to passage of the second update time, access second user input received from the second client device, wherein the second user input includes a second stateless operation for performing a first modification and a second modification to the first data record and indicates the first version;
determine a mismatch between the second version of the plurality of data records and the first version indicated in the second user input;
in response to the mismatch, determine, based on the second configuration data, a control action that corresponds to the mismatch; and
based on the control action, prevent the first modification to the second version of the plurality of data records; and
based on the control action, determine a third version of the plurality of data records based on the second version and the second modification of the second user input.

2. The system of claim 1, further comprising computer-executable instructions to:
- determine, based on the first configuration data, a first refresh time associated with the first client device;
- in response to passage of the first refresh time, provide the third version of the plurality of data records to the first client device;
- determine, based on the second configuration data, a second refresh time associated with the second client device; and
- in response to passage of the second refresh time, provide the third version of the plurality of data records to the second client device.

3. The system of claim 1, further comprising computer-executable instructions to:
- determine, based on the second configuration data, a staleness time associated with the second client device;
- determine storage of the first version of the plurality of data records in association with the second client device for a length of time greater than the staleness time, wherein the first modification is prevented further in response to the staleness time; and
- provide the third version of the plurality of data records to the second client device.

4. The system of claim 1, further comprising computer-executable instructions to:
- determine a characteristic of the first data record;
- determine the first update time based on correspondence between the characteristic and the first configuration data associated with the first client device; and
- determine the second update time based on correspondence between the characteristic and the second configuration data associated with the second client device.

5. A method comprising:
- providing first configuration data to a first device to cause the first device to one or more of receive data records or provide user input modifying data records at one or more first times;
- providing second configuration data to a second device to cause the second device to one or more of receive data records or provide user input modifying data records at one or more second times;
- accessing, at a third time, first user input received from the first device, wherein the first user input indicates a first version of a data record;
- determining correspondence between the first version of the data record indicated by the first user input and the first version of the data record stored in association with a server;
- in response to the correspondence, determining a second version of the data record based on the first version of the data record and the first user input;
- accessing, at a fourth time subsequent to the third time, second user input received from the second device, wherein the second user input includes a first modification and a second modification and indicates the first version of the data record;
- determining a mismatch between the first version indicated by the second user input and the second version stored in association with the server;
- in response to the mismatch, determining that the second configuration data indicates a control action that corresponds to the mismatch;
- based on the control action, preventing the first modification to the second version of the data record; and
- based on the control action, determining a third version of the data record based on the second version of the data record and the second modification of the second user input.

6. The method of claim 5, further comprising:
- determining a first type associated with the first modification and a second type associated with the second modification;
- wherein the first modification is prevented based on correspondence between the control action and the first type; and
- wherein the third version is determined using the second modification based on a lack of correspondence between the control action and the second type.

7. The method of claim 5, further comprising:
- determining, based on the first configuration data, a first update time associated with the first device;
- determining passage of the first update time, wherein the first user input is received from the first device in response to passage of the first update time;
- determining, based on the second configuration data, a second update time associated with the second device; and
- determining passage of the second update time, wherein the second user input is received from the second device in response to passage of the second update time.

8. The method of claim 5, further comprising:
- determining, based on the first configuration data, a first refresh time associated with the first device;
- determining passage of the first refresh time;
- in response to the passage of the first refresh time, providing the third version of the data record to the first device;
- determining, based on the second configuration data, a second refresh time associated with the second device;
- determining passage of the second refresh time; and
- in response to the passage of the second refresh time, providing the third version of the data record to the second device.

9. The method of claim 5, further comprising:
- determining disassociation of the first device from a network associated with a server storing the third version of the data record;
- determining, based on the first configuration data, a first staleness time associated with the first device;
- determining passage of the first staleness time;
- receiving third user input to modify the third version of the data record subsequent to the passage of the first staleness time; and
- in response to the passage of the first staleness time, prevent modification of the third version of the data record based on the third user input.

10. The method of claim 5, further comprising:
- in response to determining the second version of the data record based on the first user input, providing the second version of the data record to the first device; and
- based on the control action, providing the second version of the data record to the second device.

11. The method of claim 5, further comprising:
- storing a first local copy of the first version of the data record in association with the first device;
- providing a first user interface to the first device;
- receiving the first user input via the first user interface;
- modifying the first local copy of the first version of the data record based on the first user input;

providing data indicative of the first local copy of the first version of the data record to a server storing the first version of the data record; and determining correspondence between the first local copy of the first version and the first version stored in the server;

wherein the second version of the data record is determined based on the first version in response to the correspondence between the first local copy of the first version and the first version stored in the server.

12. The method of claim 11, further comprising:

providing a second user interface to the second device;

storing a second local copy of the first version of the data record in association with the second device;

receiving the second user input via the second user interface;

modifying the second local copy based on the second user input;

providing data indicative of the second local copy to the server; and determining a mismatch between the second local copy of the first version and the second version stored in the server;

wherein the first modification is prevented based on the mismatch.

13. The method of claim 12, further comprising:

in response to the mismatch, providing the third version of the data record from the server to the second device; and storing the third version as the second local copy.

14. A system comprising:

one or more memories storing computer-executable instructions;

one or more hardware processors to execute the computer-executable instructions to:

access first configuration data associated with a first device;

determine a first refresh time based on the first configuration data;

in response to passage of the first refresh time, provide a first version of a data record to the first device;

determine a second version of the data record based on the first version;

determine a first update time based on the first configuration data;

in response to passage of the first update time, access first user input received from the first device, wherein the first user input indicates the first version;

determine a mismatch between the first version indicated in the first user input and the second version of the data record;

based on the first configuration data, in response to the mismatch, determine a third version of the data record based on the second version of the data record and the first user input; and provide the third version of the data record to the first device.

15. The system of claim 14, further comprising computer-executable instructions to:

store a local copy of the first version of the data record in association with the first device;

determine a first staleness time based on the first configuration data; and determine that the first user input is received prior to passage of the first staleness time;

wherein the third version of the data record is determined based at least in part on receipt of the first user input prior to the passage of the first staleness time.

16. The system of claim 14, further comprising computer-executable instructions to:

access second configuration data associated with a second device;

determine a second refresh time based on the second configuration data;

in response to passage of the second refresh time, provide the first version of the data record to the second device;

determine a second update time based on the second configuration data;

in response to passage of the second update time, receive second user input from the second device, wherein the second user input indicates the first version;

in response to a mismatch between the first version associated with the second user input and the third version associated with the data record, determine a control action based on the second configuration data; and based on the control action, prevent at least one modification to the data record based on the second user input.

17. The system of claim 16, further comprising computer-executable instructions to:

determine a first modification and a second modification to the data record based on the second user input;

determine a first type associated with the first modification and a second type associated with the second modification;

in response to correspondence between the control action and the first type, prevent the first modification to the second version of the data record; and in response to a lack of correspondence between the control action and the second type, determine a fourth version of the data record based on the third version of the data record and the second modification.

18. The system of claim 16, further comprising computer-executable instructions to:

based on the control action, provide the third version of the data record to the second device, wherein the third version of the data record replaces a local copy of the first version of the data record stored in association with the second device.

19. The system of claim 14, further comprising computer-executable instructions to:

in response to determining the third version of the data record based on the second version of the data record, one or more of: provide the third version of the data record to the first device or provide an indication that the third version of the data record was determined based on the first user input to cause the first device to modify a local copy of the first version of the data record.

20. The system of claim 14, further comprising computer-executable instructions to:

determine disassociation of the first device from a network associated with a server storing the data record;

wherein the first user input received from the first device includes a local copy of the data record having one or more modifications that occurred while the first device was disassociated from the network.

* * * * *